US012614420B2

(12) United States Patent
Jain et al.

(10) Patent No.: US 12,614,420 B2
(45) Date of Patent: Apr. 28, 2026

(54) POWER MANAGEMENT BASED ON FRAME SLICING

(71) Applicants:Advanced Micro Devices, Inc., Santa Clara, CA (US); ATI Technologies ULC, Markham (CA)

(72) Inventors: Ashish Jain, Austin, TX (US); Arash Moghimi, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 172 days.

(21) Appl. No.: 18/478,712

(22) Filed: Sep. 29, 2023

(65) Prior Publication Data

US 2024/0029488 A1     Jan. 25, 2024

(51) Int. Cl.
*G07C 9/00*          (2020.01)
*B60R 25/20*          (2013.01)
            (Continued)

(52) U.S. Cl.
CPC ...... *G07C 9/00309* (2013.01); *B60R 25/2072* (2013.01); *B60R 25/241* (2013.01); *B60R 25/245* (2013.01); *B60R 25/246* (2013.01); *G01S 13/84* (2013.01); *G07C 9/28* (2020.01); *H01Q 1/3241* (2013.01); *H01Q 25/00* (2013.01); *H01Q 25/04* (2013.01); *H04B 1/7073* (2013.01); *H04B 7/0669* (2013.01); *H04B 7/15* (2013.01); *H04B 17/318* (2015.01);
            (Continued)

(58) Field of Classification Search
CPC .... G07C 9/00309; G07C 9/28; H04B 17/318; H04B 1/7073; H04W 4/40; H04W 12/128; H04W 12/64; H04W 12/122; G01S 13/84; H01Q 1/3241
See application file for complete search history.

(56) References Cited

U.S. PATENT DOCUMENTS

| | | | |
|---|---|---|---|
| 5,930,390 | A | 7/1999 | Coelho |
| 6,524,198 | B2 | 2/2003 | Takeda |
| (Continued) | | | |

OTHER PUBLICATIONS

Non-Final Office Action in U.S. Appl. No. 15/686,892, mailed Jun. 1, 2020, 14 pages.

(Continued)

*Primary Examiner* — Thomas D Alunkal
(74) *Attorney, Agent, or Firm* — Kowert, Hood, Munyon, Rankin & Goetzel, P.C.; Rory D. Rankin

(57)          ABSTRACT

Systems, apparatuses, and methods for implementing efficient power optimization in a computing system are disclosed. A system management unit configured to track computing activity of a computing device while processing each frame of a plurality of frames. The computing activity is tracked at least for a given period of time comprising a plurality of time slices. The system management unit further correlates a time slice associated with a given frame with a time slice associated with at least one previously processed frame from the plurality of frames, based at least in part on the tracked computing activity. The system management unit predicts a clock frequency to render the given frame, based at least in part on the correlation and renders the given frame using the predicted clock frequency.

20 Claims, 6 Drawing Sheets

(51) Int. Cl.

| | |
|---|---|
| *B60R 25/24* | (2013.01) |
| *G01S 13/84* | (2006.01) |
| *G07C 9/28* | (2020.01) |
| *H01Q 1/32* | (2006.01) |
| *H01Q 25/00* | (2006.01) |
| *H01Q 25/04* | (2006.01) |
| *H04B 1/7073* | (2011.01) |
| *H04B 7/06* | (2006.01) |
| *H04B 7/15* | (2006.01) |
| *H04B 17/318* | (2015.01) |
| *H04W 4/40* | (2018.01) |
| *H04W 12/122* | (2021.01) |
| *H04W 12/128* | (2021.01) |
| *H04W 12/64* | (2021.01) |
| *G01S 7/02* | (2006.01) |
| *G01S 13/76* | (2006.01) |

(52) U.S. Cl.
CPC ........... *H04W 4/40* (2018.02); *H04W 12/122* (2021.01); *H04W 12/128* (2021.01); *H04W 12/64* (2021.01); *B60R 2325/108* (2013.01); *B60R 2325/205* (2013.01); *G01S 7/021* (2013.01); *G01S 13/767* (2013.01); *G07C 2009/00555* (2013.01); *G07C 2209/61* (2013.01)

(56) References Cited

U.S. PATENT DOCUMENTS

| | | | |
|---|---|---|---|
| 6,618,397 | B1 | 9/2003 | Huang |
| 6,680,976 | B1 | 1/2004 | Chen et al. |
| 6,683,988 | B1 * | 1/2004 | Fukunaga ........ H04N 21/44209 |
| | | | 348/E7.071 |
| 6,754,234 | B1 * | 6/2004 | Wiesner ............. H04N 21/2365 |
| | | | 375/E7.269 |
| 7,471,823 | B2 | 12/2008 | Ubillos et al. |
| 7,813,000 | B2 * | 10/2010 | Temasky ................. G06F 21/10 |
| | | | 358/1.9 |
| 8,175,181 | B1 * | 5/2012 | Nabar ................... H04L 1/0009 |
| | | | 375/267 |
| 9,270,969 | B2 * | 2/2016 | Hong ................... H04N 13/144 |
| 9,407,923 | B2 | 8/2016 | Barak |
| 9,924,134 | B2 * | 3/2018 | Glen ......................... H04N 5/46 |
| 11,100,604 | B2 * | 8/2021 | Cheng ....................... G06T 1/20 |
| 2001/0033286 | A1 | 10/2001 | Stokes et al. |
| 2005/0223165 | A1 | 10/2005 | Schmidt et al. |
| 2006/0171596 | A1 | 8/2006 | Sung et al. |
| 2008/0049651 | A1 | 2/2008 | Chang et al. |
| 2008/0201716 | A1 | 8/2008 | Du et al. |
| 2009/0052537 | A1 | 2/2009 | Burazerovic et al. |
| 2009/0148058 | A1 | 6/2009 | Dane et al. |
| 2009/0213940 | A1 | 8/2009 | Steinbach et al. |
| 2010/0050225 | A1 | 2/2010 | Bennett |
| 2010/0157154 | A1 | 6/2010 | Kobayashi et al. |
| 2010/0177776 | A1 | 7/2010 | Crinon et al. |
| 2010/0218019 | A1 * | 8/2010 | Eckhard ................ G06F 1/3203 |
| | | | 713/300 |

| | | | |
|---|---|---|---|
| 2011/0050695 | A1 | 3/2011 | Sullivan et al. |
| 2011/0066262 | A1 | 3/2011 | Kelly et al. |
| 2011/0157196 | A1 | 6/2011 | Nave et al. |
| 2011/0263332 | A1 | 10/2011 | Mizrachi |
| 2011/0299606 | A1 | 12/2011 | Chen et al. |
| 2012/0008679 | A1 | 1/2012 | Bakke |
| 2012/0079329 | A1 | 3/2012 | Steinbach et al. |
| 2012/0236934 | A1 | 9/2012 | Chen et al. |
| 2012/0243009 | A1 | 9/2012 | Chapman et al. |
| 2013/0039594 | A1 | 2/2013 | Chen et al. |
| 2013/0053141 | A1 | 2/2013 | Guérin et al. |
| 2013/0058394 | A1 | 3/2013 | Nilsson et al. |
| 2013/0076771 | A1 | 3/2013 | Bachman et al. |
| 2013/0083161 | A1 | 4/2013 | Hsu et al. |
| 2013/0335432 | A1 | 12/2013 | Iwasaki |
| 2014/0028876 | A1 | 1/2014 | Mills |
| 2014/0194196 | A1 | 7/2014 | Hoy et al. |
| 2014/0211860 | A1 | 7/2014 | Zhao et al. |
| 2014/0267780 | A1 | 9/2014 | Spears et al. |
| 2014/0307168 | A1 * | 10/2014 | Law ......................... G09G 5/12 |
| | | | 348/500 |
| 2014/0317068 | A1 | 10/2014 | Yang et al. |
| 2014/0372918 | A1 | 12/2014 | Wang |
| 2014/0376612 | A1 | 12/2014 | Chen et al. |
| 2016/0054782 | A1 * | 2/2016 | Kaburlasos ........... G06F 1/3234 |
| | | | 713/320 |
| 2016/0358305 | A1 | 12/2016 | Banerjee et al. |
| 2016/0381392 | A1 | 12/2016 | Wiegand et al. |
| 2017/0142447 | A1 | 5/2017 | Toth et al. |
| 2017/0262955 | A1 | 9/2017 | Lin et al. |
| 2018/0039317 | A1 | 2/2018 | Riguer |
| 2018/0091819 | A1 | 3/2018 | Cook et al. |
| 2019/0068983 | A1 | 2/2019 | Ryan et al. |
| 2019/0104311 | A1 | 4/2019 | Amer et al. |
| 2019/0158704 | A1 | 5/2019 | Sines et al. |
| 2019/0182308 | A1 | 6/2019 | Vu et al. |
| 2020/0050251 | A1 * | 2/2020 | Naik ....................... G06F 1/324 |
| 2020/0341533 | A1 | 10/2020 | Ho et al. |
| 2021/0271287 | A1 * | 9/2021 | Jose ..................... G06F 9/4837 |
| 2024/0094796 | A1 * | 3/2024 | Narayanaswamy .... G06F 1/206 |

OTHER PUBLICATIONS

International Search Report and Written Opinion for International Application No. PCT/US2023/085001, mailed Apr. 2, 2024, 11 pgs.

International Search Report and Written Opinion in PCT AppIn No. PCT/US2024/047196, mailed Dec. 13, 2024, 11 pgs.

International Search Report and Written Opinion in International Application No. PCT/IB2018/057511, mailed Jan. 22, 2019, 8 pages.

Non-Final Office Action in U.S. Appl. No. 15/686,892, mailed Mar. 7, 2019, 14 pages.

Non-Final Office Action in U.S. Appl. No. 15/834,400, mailed Feb. 27, 2019, 16 pages.

Final Office Action in U.S. Appl. No. 15/834,400, mailed Jul. 10, 2019, 15 pages.

Non-Final Office Action in U.S. Appl. No. 15/721,078, mailed Jan. 31, 2019, 9 pages.

Non-Final Office Action in U.S. Appl. No. 15/816,765, mailed Jun. 26, 2019, 11 pages.

* cited by examiner

500

Identify time slices within a given period of time of processing frames 502

Track computing activity in each time slice while processing frames 504

Correlate a time slice of a given frame with a time slice of a preceding frame 506

Predict operating parameter for the given frame based on the correlation 508

Render next frame based on the predicted operating parameter 510

Recalibration condition met? 512

Yes

Modify time slices 514

| Frame | Time Slice | Task | Subtask | Operating Parameters |
|---|---|---|---|---|
| Frame 0 | 0-0 | Task 0 | 410-1 | Freq: N ms |
| | | | 410-2 | Freq: M ms |
| | | | 410-3 | Freq: N+ΔN ms |
| | 0-1 | Task 1 | 420-1 | Freq: P ms |
| | | | 420-2 | Freq: R ms |
| | | | 420-3 | Freq: Q ms |
| | 0-2 | Task 2 | 430-1 | Freq: N ms |
| | | | 430-2 | Freq: M ms |
| | | | 430-3 | Freq: N+ΔN ms |
| | 0-3 | Task 3 | 440-1 | Freq: N ms |
| | | | 440-2 | Freq: M ms |
| | | | 440-3 | Freq: N+ΔN ms |
| Frame 1 | 1-0 | Task 0 | 430-1 | Freq: N ms |
| | | | 430-2 | Freq: M ms |
| | | | 430-3 | Freq: N+ΔN ms |

POWER MANAGEMENT BASED ON FRAME SLICING

BACKGROUND

Description of the Related Art

During the design of a computer or other processor-based system, many design factors must be considered. A successful design requires a variety of tradeoffs between power consumption, performance, thermal output, and so on. For example, the design of a computer system with an emphasis on high performance allows for greater power consumption. Conversely, the design of a portable computer system that is sometimes powered by a battery may emphasize reducing power consumption at the expense of some performance. Whatever the particular design goals, a computing system typically has a given amount of power available to it during operation. This power must be allocated amongst the various components within the system—a portion is allocated to the central processing unit, another portion to the memory subsystem, a portion to a graphics processing unit, and so on. How the power is allocated amongst the system components may also change during operation.

Processing systems conventionally engage various management techniques to manage operating system parameters, such as clock frequency and system power, to ensure that the overall system operates effectively. Mechanisms such as dynamic voltage and frequency scaling, for example, can help mitigate power management issues by adjusting power consumption in response to workload demands. Additionally, cooling systems can help dissipate excess heat, enabling sustained performance while maintaining system stability. Careful consideration of power management strategies is therefore essential for ensuring optimal performance and longevity in GPU processing environments.

However, current management schemes for operating parameters are usually based on average behavior. For instance, when frames are being rendered, the processing system computes an adequate power management scheme based on average power dissipated or graphics engine activity over the last few rendered frames. This leads to a conservative frequency selection which burns power unnecessarily, or alternatively leads to an average frequency selection which would hurt performance of some phases of the frame.

In view of the above, improved systems and methods for efficient system management for frame rendering are desired.

BRIEF DESCRIPTION OF THE DRAWINGS

The advantages of the methods and mechanisms described herein may be better understood by referring to the following description in conjunction with the accompanying drawings, in which:

FIG. 5 illustrates a method for tracking computing activity to predict one or more parameters of a task scheduled to be executed.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for efficient power management in processing systems are disclosed. A system management circuitry tracks computing activity of a computing device while processing each frame of multiple frames. In various implementations, the number of frames is fixed, programmable, and/or dynamically identified. The computing activity is tracked for at least a given period of time including multiple frames where each frame is divided into multiple time slices. The system management circuitry correlates time slices during processing of subsequent frames with a time slice during processing of at least one previously processed frame of the number of frames, based at least in part on the tracked computing activity, and predicts clock frequencies to render the frames. Subsequent frames are rendered using the predicted clock frequency for each time slice during the frame.

Figure 1:
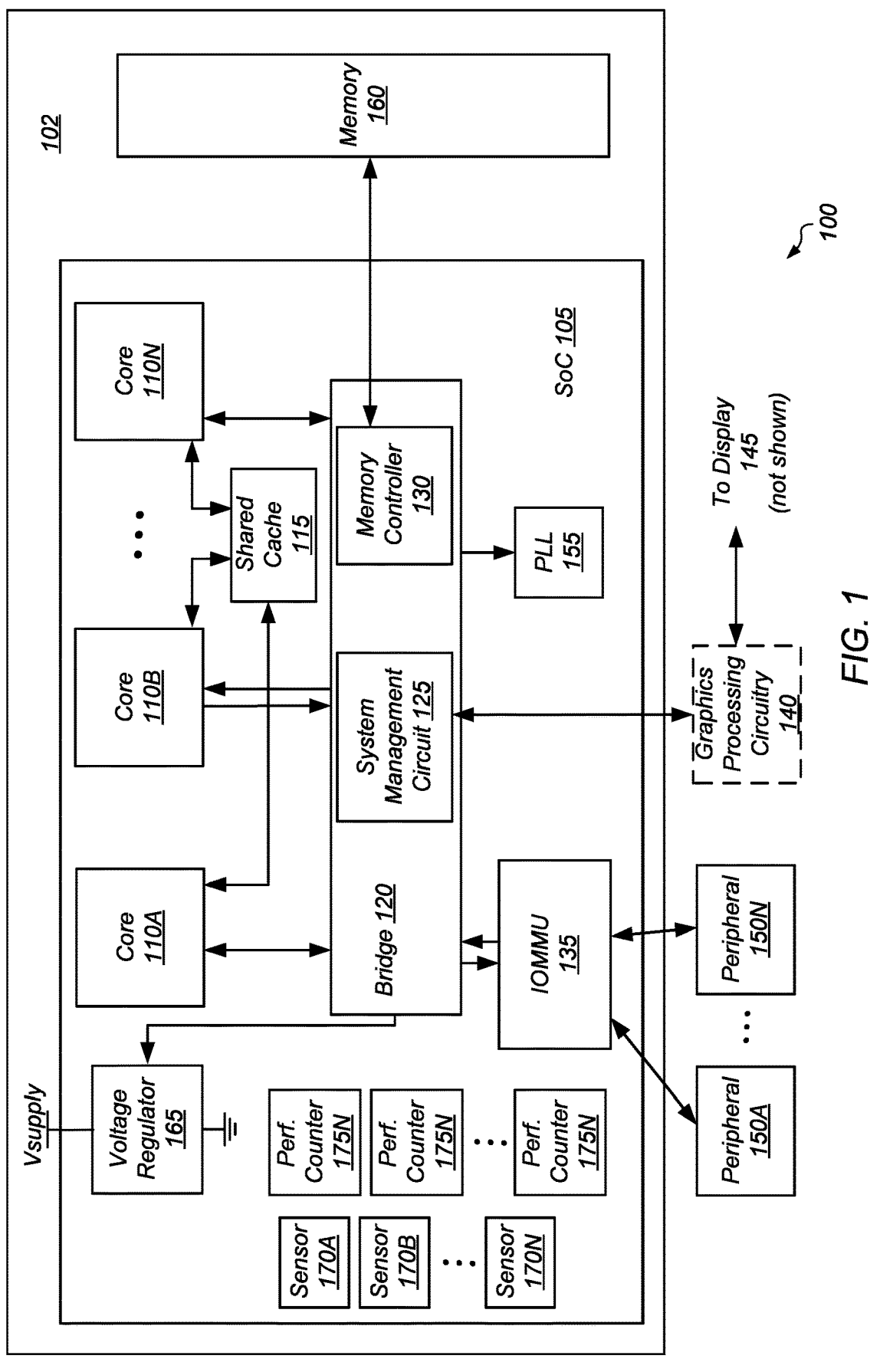
FIG. 1 is a block diagram of one implementation of a computing system.

Referring now to FIG. 1, a block diagram of one implementation of a computing system 100 is shown. In this implementation, the illustrated computing system 100 includes system on chip (SoC) 105 coupled to memory 160. However, implementations in which one or more of the illustrated components of the SoC 105 are not integrated onto a single chip are possible and are contemplated. In some implementations, SoC 105 includes a plurality of processor cores (circuits) 110A-N and GPU 140. In the illustrated implementation, the SoC 105, Memory 160, and other components (not shown) are part of a system board 102, and one or more of the peripherals 150A-150N and GPU 140 are discrete entities (e.g., daughter boards, etc.) that are coupled to the system board 102. In other implementations, GPU 140 and/or one or more of Peripherals 150 may be permanently mounted on board 102 or otherwise integrated into SoC 105. It is noted that processor cores 110A-N can also be referred to as processing units or processors. As described below, certain types of circuits are referred to as "units" (e.g., a decode unit, compute unit, an arithmetic logic unit, functional unit, memory management unit, etc.). Accordingly, the term unit or units also refers to circuits or circuitry unless otherwise indicated.

Processor cores 110A-N and GPU 140 are configured to execute instructions of one or more instruction set architectures (ISAs), which can include operating system instructions and user application instructions. These instructions include memory access instructions which can be translated and/or decoded into memory access requests or memory access operations targeting memory 160.

In another implementation, SoC 105 includes a single processor core 110. In multi-core implementations, processor cores 110 can be identical to each other (i.e., symmetrical multi-core), or one or more cores can be different from others (i.e., asymmetric multi-core). Each processor core 110 includes one or more execution units, cache memories, schedulers, branch prediction circuits, and so forth. Furthermore, each of processor cores 110 is configured to assert requests for access to memory 160, which functions as main memory for computing system 100. Such requests include read requests, and/or write requests, and are initially received from a respective processor core 110 by bridge 120. Each processor core 110 can also include a queue or buffer that holds in-flight instructions that have not yet completed execution. This queue can be referred to herein as an "instruction queue." Some of the instructions in a processor core 110 can still be waiting for their operands to become available, while other instructions can be waiting for an available arithmetic logic unit (ALU). The instructions which are waiting on an available ALU can be referred to as pending ready instructions. In one implementation, each processor core 110 is configured to track the number of pending ready instructions.

Input/output memory management unit (IOMMU) 135 is coupled to bridge 120 in the implementation shown. In one implementation, bridge 120 functions as a northbridge device and IOMMU 135 functions as a southbridge device in computing system 100. In other implementations, bridge 120 can be a fabric, switch, bridge, any combination of these components, or another component. A number of different types of peripheral buses (e.g., peripheral component interconnect (PCI) bus, PCI-Extended (PCIX), PCIE (PCI Express) bus, gigabit Ethernet (GBE) bus, universal serial bus (USB)) can be coupled to IOMMU 135. Various types of peripheral devices 150A-N can be coupled to some or all of the peripheral buses. Such peripheral devices 150A-N include (but are not limited to) keyboards, mice, printers, scanners, joysticks or other types of game controllers, media recording devices, external storage devices, network interface cards, and so forth. At least some of the peripheral devices 150A-N that are coupled to IOMMU 135 via a corresponding peripheral bus can assert memory access requests using direct memory access (DMA). These requests (which can include read and write requests) are conveyed to bridge 120 via IOMMU 135.

In some implementations, SoC 105 includes a graphics processing unit (GPU) 140 configured to be coupled to display 145 (not shown) of computing system 100. In some implementations, GPU 140 is an integrated circuit that is separate and distinct from SoC 105. GPU 140 performs various video processing functions and provides the processed information to display 145 for output as visual information. GPU 140 can also be configured to perform other types of tasks scheduled to GPU 140 by an application scheduler. GPU 140 includes a number 'N' of compute units for executing tasks of various applications or processes, with 'N' a positive integer. The 'N' compute units of GPU 140 is also be referred to as "processing units". Each compute unit of GPU 140 is configured to assert requests for access to memory 160.

In one implementation, memory controller 130 is integrated into bridge 120. In other implementations, memory controller 130 is separate from bridge 120. Memory controller 130 receives memory requests conveyed from bridge 120. Data accessed from memory 160 responsive to a read request is conveyed by memory controller 130 to the requesting agent via bridge 120. Responsive to a write request, memory controller 130 receives both the request and the data to be written from the requesting agent via bridge 120. If multiple memory access requests are pending at a given time, memory controller 130 arbitrates between these requests. For example, memory controller 130 can give priority to critical requests while delaying non-critical requests when the power budget allocated to memory controller 130 restricts the total number of requests that can be performed to memory 160.

In some implementations, memory 160 includes a plurality of memory modules. Each of the memory modules includes one or more memory devices (e.g., memory chips) mounted thereon. In some implementations, memory 160 includes one or more memory devices mounted on a motherboard or other carrier upon which SoC 105 is also mounted. In some implementations, at least a portion of memory 160 is implemented on the die of SoC 105 itself. Implementations having a combination of the aforementioned implementations are also possible and contemplated. In one implementation, memory 160 is used to implement a random access memory (RAM) for use with SoC 105 during operation. The RAM implemented can be static RAM (SRAM) or dynamic RAM (DRAM). The type of DRAM that is used to implement memory 160 includes (but are not limited to) double data rate (DDR) DRAM, DDR2 DRAM, DDR3 DRAM, and so forth.

Although not explicitly shown in FIG. 1, SoC 105 can also include one or more cache memories that are internal to the processor cores 110. For example, each of the processor cores 110 can include an L1 data cache and an L1 instruction cache. In some implementations, SoC 105 includes a shared cache 115 that is shared by the processor cores 110. In some implementations, shared cache 115 is a level two (L2) cache. In some implementations, each of processor cores 110 has an L2 cache implemented therein, and thus shared cache 115 is a level three (L3) cache. Cache 115 can be part of a cache subsystem including a cache controller.

In one implementation, system management circuit 125 is integrated into bridge 120. In other implementations, system management circuit 125 can be separate from bridge 120 and/or system management circuit 125 can be implemented as multiple, separate components in multiple locations of SoC 105. System management circuit 125 is configured to manage the power states of the various processing units of SoC 105. In one implementation, system management circuit 125 uses dynamic voltage and frequency scaling (DVFS) to change the frequency and/or voltage of a processing unit to limit the processing unit's power consumption to a chosen power allocation.

SoC 105 includes multiple temperature sensors 170A-N, which are representative of any number of temperature sensors. It should be understood that while sensors 170A-N are shown on the left-side of the block diagram of SoC 105, sensors 170A-N can be spread throughout the SoC 105 and/or can be located next to the major components of SoC 105 in the actual implementation of SoC 105. In one implementation, there is a sensor 170A-N for each core 110A-N, compute unit of GPU 140, and other major components. In this implementation, each sensor 170A-N tracks the temperature of a corresponding component. In another implementation, there is a sensor 170A-N for different geographical regions of SoC 105. In this implementation, sensors 170A-N are spread throughout SoC 105 and located so as to track the temperatures in different areas of SoC 105 to monitor whether there are any hot spots in SoC 105. In other implementations, other schemes for positioning the sensors 170A-N within SoC 105 are possible and are contemplated.

SoC 105 also includes multiple performance counters 175A-N, which are representative of any number and type of performance counters. It should be understood that while performance counters 175A-N are shown on the left-side of the block diagram of SoC 105, performance counters 175A-N can be spread throughout the SoC 105 and/or can be located within the major components of SoC 105 in the actual implementation of SoC 105. For example, in one implementation, each core 110A-N includes one or more performance counters 175A-N, memory controller 130 includes one or more performance counters 175A-N, GPU 140 includes one or more performance counters 175A-N, and other performance counters 175A-N are utilized to monitor the performance of other components. Performance counters 175A-N can track a variety of different performance metrics, including the instruction execution rate of cores 110A-N and GPU 140, consumed memory bandwidth, row buffer hit rate, cache hit rates of various caches (e.g., instruction cache, data cache), and/or other metrics.

In one implementation, SoC 105 includes a phase-locked loop (PLL) unit 155 coupled to receive a system clock signal. PLL unit 155 includes a number of PLLs configured to generate and distribute corresponding clock signals to each of processor cores 110 and to other components of SoC 105. In one implementation, the clock signals received by each of processor cores 110 are independent of one another. Furthermore, PLL unit 155 in this implementation is configured to individually control and alter the frequency of each of the clock signals provided to respective ones of processor cores 110 independently of one another. The frequency of the clock signal received by any given one of processor cores 110 can be increased or decreased in accordance with power states assigned by system management circuit 125. The various frequencies at which clock signals are output from PLL unit 155 correspond to different operating parameters for each of processor cores 110. Accordingly, a change of operating parameter for a particular one of processor cores 110 is put into effect by changing the frequency of its respectively received clock signal, an operating voltage, or a combination thereof.

An operating parameter for the purposes of this disclosure can be defined as an operating frequency (or clock frequency), and can also include an operating voltage or power (e.g., supply voltage or power supplied to a functional unit). Increasing an operating parameter for a given functional unit can be defined as increasing the frequency of a clock signal provided to that unit and can also include increasing its operating voltage. Similarly, decreasing an operating parameter for a given functional unit can be defined as decreasing the clock frequency, and can also include decreasing the operating voltage. Limiting an operating parameter can be defined as limiting the clock frequency and/or operating voltage to specified maximum values for particular set of conditions (but not necessarily maximum limits for all conditions). Thus, when an operating parameter is limited for a particular processing unit, it can operate at a clock frequency and operating voltage up to the specified values for a current set of conditions, but can also operate at clock frequency and operating voltage values that are less than the specified values.

In the case where changing the respective operating parameters of one or more processor cores 110 includes changing of one or more respective clock frequencies, system management circuit 125 changes the state of digital signals provided to PLL unit 155. Responsive to the change in these signals, PLL unit 155 changes the clock frequency of the affected processing core(s) 110. Additionally, system management circuit 125 can also cause PLL unit 155 to inhibit a respective clock signal from being provided to a corresponding one of processor cores 110.

In the implementation shown, SoC 105 also includes voltage regulator 165. In other implementations, voltage regulator 165 can be implemented separately from SoC 105. Voltage regulator 165 provides a supply voltage to each of processor cores 110 and to other components of SoC 105. In some implementations, voltage regulator 165 provides a supply voltage that is variable according to a particular operating parameter. In some implementations, each of processor cores 110 shares a voltage plane. Thus, each processing core 110 in such an implementation operates at the same voltage as the other ones of processor cores 110. In another implementation, voltage planes are not shared, and thus the supply voltage received by each processing core 110 is set and adjusted independently of the respective supply voltages received by other ones of processor cores 110. Thus, operating parameter adjustments that include adjustments of a supply voltage can be selectively applied to each processing core 110 independently of the others in implementations having non-shared voltage planes. In the case where changing the operating parameter includes changing an operating voltage for one or more processor cores 110, system management circuit 125 changes the state of digital signals provided to voltage regulator 165. Responsive to the change in the signals, voltage regulator 165 adjusts the supply voltage provided to the affected ones of processor cores 110. In instances when power is to be removed from (i.e., gated) one of processor cores 110, system management circuit 125 sets the state of corresponding ones of the signals to cause voltage regulator 165 to provide no power to the affected processing core 110.

In various implementations described herein, system management circuit 125 is configured to determine one or more operating parameters of a computing device (such as GPU 140), when executing one or more tasks (e.g., tasks executed when rendering a frame) based on computing activity of the computing device tracked during a given period of time (hereinafter activity period). In an implementation, system management circuit 125 tracks computing activity for the computing device during each of a plurality of time slices within the activity period. For example, when rendering frames, system management circuit 125 can track computing activity of the computing device while processing each time slice of a number of time slices that each frame is divided into. Further, based on data resulting from such tracking, system management circuit 125 can predict operating parameters for time slices in future frames based on the computing activity during similar slices in previous frames. as described in the description that follows.

In one implementation, system management circuit 125 can store data generated as a result of tracking the computing activity at a specific memory location, such as in a data array (or other memory location). Further, system management circuit 125 uses such data to dictate operating parameters for other similar frames subsequently encountered for render. This data is hereinafter referred to as the "activity data." In an implementation, the system management circuit 125 uses the activity data to manage power and frequency consumption of one or more computing units during execution of various tasks. For example, a clock generation circuitry (not shown) can generate a clock signal with clock frequencies predicted using the activity data.

In various implementations, computing system 100 can be a computer, laptop, mobile device, server, web server, cloud computing server, storage system, or any of various other types of computing systems or devices. It is noted that the number of components of computing system 100 and/or SoC 105 can vary from implementation to implementation. There can be more or fewer of each component/subcomponent than the number shown in FIG. 1. It is also noted that computing system 100 and/or SoC 105 can include other components not shown in FIG. 1. Additionally, in other implementations, computing system 100 and SoC 105 can be structured in other ways than shown in FIG. 1.

Figure 2:
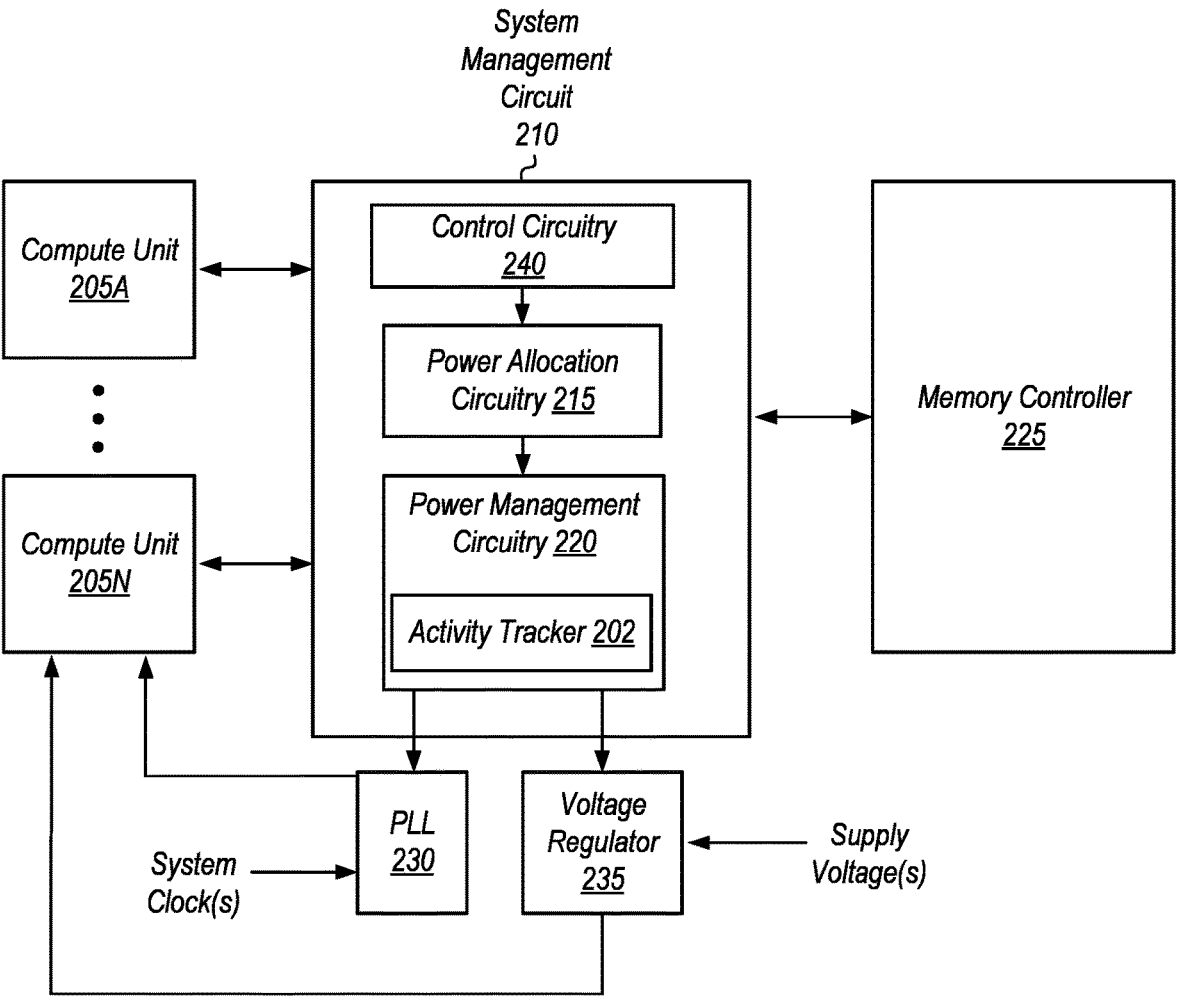
FIG. 2 is a block diagram of another implementation of a computing system.

Turning now to FIG. 2, a block diagram of one implementation of a system management circuit 210 is shown. System management circuit 210 is coupled to compute units 205A-N, memory controller 225, phase-locked loop (PLL) unit 230, and voltage regulator 235. System management circuit 210 can also be coupled to one or more other components not shown in FIG. 2. Compute units 205A-N are representative of any number and type of compute units (e.g., CPU, GPU, FPGA, etc.), and compute units 205A-N may also be referred to as processors or processing units. In some implementations, compute units include either or both of general purpose and special purpose computing circuitry. For example, in one implementation, at least one compute unit is a central processing unit (CPU) and another compute unit is a graphics processing unit (GPU).

System management circuit 210 includes control circuitry 240, power allocation circuitry 215, and power management circuitry 220. In the example shown, the power management circuitry 220 is shown to include an activity tracker 202. In some implementations, control unit 240 is configured to determine how power is allocated in the computing system. In one scenario, in response to detecting a particular condition, the control unit 240 determines a power budget allocation for various circuits within the computing system. In some implementations, system management circuit 210 provides information to one or both of power allocation circuitry 215 and power management circuitry 220 for use in making power allocation decisions. Various such implementations and combinations are possible and are contemplated. In one scenario, the above-mentioned condition is a condition which requires a reduction in power consumption of the computing system (or some component(s) of the computing system). This condition may occur as a result of the system reaching a maximum allowed or allocated power. Alternatively, this condition may occur as a result of a thermal condition (e.g., a maximum operating temperature has been reached). In response to detecting the condition, control unit 240 evaluates a variety of parameters including one or more of the currently running task(s), types of tasks, phases of given tasks, and so on. In another scenario this condition may be enforced intentionally by some policy/mechanism implemented by the combined hardware and system software/firmware in an attempt to reach a desired software-dependent optimal operational point of the power performance setting. In various such implementations, certain attributes of the executing software application are tracked on the hardware as the software application is executing (at runtime) and are used to when making decisions taken at each point in time. It is noted that while power management circuitry 220 is shown to be included in the system management circuitry 210, in other implementations the power management unit circuitry and/or activity tracker 202 are located elsewhere. For example, in one implementation, the power management circuitry 220 and activity tracker 202 are located with a graphics processing unit 140 or some other unit.

Power allocation circuitry 215 is configured to allocate a power budget to each of compute units 205A-N, to a memory subsystem including memory controller 225, and/or to one or more other components. The total amount of power available to power allocation circuitry 215 to be dispersed to the components can be capped for the host system. Power allocation circuitry 215 receives various inputs from compute units 205A-N including a status of the miss status holding registers (MSHRs) of compute units 205A-N, the instruction execution rates of compute units 205A-N, the number of pending ready-to-execute instructions in compute units 205A-N, the instruction and data cache hit rates of compute units 205A-N, the consumed memory bandwidth, and/or one or more other input signals. Power allocation circuitry 215 can utilize these inputs to determine whether compute units 205A-N have tasks to execute, and then power allocation unit 215 can adjust the power budget allocated to compute units 205A-N (e.g., by control unit 240) according to these determinations. Power allocation circuitry 215 can also receive inputs from memory controller 225, with these inputs including the consumed memory bandwidth, number of total requests in the pending request queue, number of critical requests in the pending request queue, number of non-critical requests in the pending request queue, and/or one or more other input signals. Power allocation circuitry 215 can utilize the status of these inputs to determine the power budget that is allocated to the memory subsystem.

PLL unit 230 receives system clock signal(s) and includes any number of PLLs configured to generate and distribute corresponding clock signals to each of compute units 205A-N and to other components. Power management circuitry 220 is configured to convey control signals to PLL unit 230 to control the clock frequencies supplied to compute units 205A-N and to other components. Voltage regulator 235 provides a supply voltage to each of compute units 205A-N and to other components. Power management circuitry 220 is configured to convey control signals to voltage regulator 235 to control the voltages supplied to compute units 205A-N and to other components. Memory controller 225 is configured to control the memory (not shown) of the host computing system or apparatus. For example, memory controller 225 issues read, write, erase, refresh, and various other commands to the memory.

In an exemplary implementation, the power management circuitry 220 manages operating frequencies and power consumption for the system. For instance, the power management circuitry 220 modifies an operating frequency of computing units in order to save power. In another example, for a computing unit executing tasks that are compute-bound, the power management circuitry 220 increases the clock frequency to improve performance. On the other hand, for memory-bound tasks, the power management circuitry 220 does not increase the frequency given that such an increase does not result in an increased (or desired increase) in performance.

Activity tracker 202 is configured to track computing activity of a computing device, such as one or more of the compute units 205A-N, and predict operating parameters such as clock frequency, for subsequent tasks queued for execution. In an implementation, during rendering of frames, activity tracker 202 is configured to track the computing activity for a number of frames for an activity period. For each frame, the computing activity is tracked during certain time slices identified within the activity period. For example, an activity period while processing each frame could be split into "n" time slices, wherein n could be a fixed, programmable, or dynamically determined positive integer. In an implementation, the number of slices can be based on the time it takes for a change in operating frequency or voltage to execute, the sampling interval of the system management circuit 210, and the like.

For instance, when rendering a first frame, the activity period is divided into four time slices, such that if an application runs at 60 Hz, then computing activity is tracked for roughly 4.167 MS at a time, which is equivalent to one-quarter of a 60 Hz frame. Another approach involves dividing the time slice based on the tasks in the frame, where at least one task executes with each one of these time slices every 16.67 MS, or once every Hz time period. In this scenario, computing activity for the at least one task is tracked for each time slice. This pattern repeats for every frame.

In an implementation, the activity tracker 202 initiates tracking of the computing activity when execution of an application is initiated by one or more compute units 205A-N. In one example, the computing activity is tracked for workloads involving repeated execution of similar tasks at a periodic rate, e.g., game rendering, video processing, and the like. In another implementation, activity data resulting from tracking the computing activity can be updated based on one or more factors. For instance, when rendering multiple frames, the activity tracker 202 can reinitiate tracking in order to update the data when the length of the frame (i.e., the amount of time it takes to render the frame) exceeds that of a previously rendered frame.

In an implementation, the computing activity tracked by the activity tracker 202 at least includes tracking operating parameters, such as voltages and frequencies, when executing a given task. In an example, operating parameters can be indicative of clock frequencies supplied to compute units 205A-N and to other components for executing a given task. The activity tracker 202 is configured to track the operating frequencies supplied to a computing unit(s) while executing a given task (such as rendering of a frame) and the power management circuitry 220 then utilizes the tracked operating frequencies to predict and control clock frequencies for supply to one or more computing components to execute other subsequent tasks "relatively similar" to the given task (e.g., consecutive frames). In an implementation, the prediction is made for time slices in which the subsequent tasks are to be executed, based on activity data tracked for time slices in which relatively similar tasks have been previously executed.

For instance, in one implementation, consecutive frames in a scene may be substantially similar due to a relatively small number of changes between the frames. Consequently, execution of a given frame is expected to be similar (e.g., consume a similar amount of processing and data resource, take a similar amount of time, etc.) to that of an immediately preceding frame when the scene is unchanged. The temporal locality between frames allows the system management circuit 210 to correlate a time slice associated with a frame, i.e., a frame to be processed, with the time slice associated with at least one previously processed frame.

Referring to the implementation of rendering of frames described above, while each frame is processing, the activity tracker 202 is configured to track computing activity of a computing circuitry or processing device, for an activity period. In various implementations, the activity period could include the entire length of the frame or a specific time period during the processing of the frame. As described in the foregoing, time slices are identified within the activity period, such that computing activity during each time slice can be tracked and stored as activity data. In an implementation, the computing activity is tracked for each frame during each time slice of the activity period, and this is performed for a number of frames. In one implementation, the tracked computing activity is indicative of at least one task executed during a given time slice, such that for similar tasks being executed while processing different frames, the activity data is utilized to correlate time slices of different frames. In an example, the activity data and the correlation between the time slices of different frames can be stored as a lookup table or other suitable data structure (as detailed in FIG. 4). Further, each such element of the data structure may be identifiable as corresponding to a portion of a frame and store a corresponding operating frequency. Then on the later frame, this data is used for predicting operating frequency for rendering of the later frame. In an example, the operating frequency is predicted by corresponding activity data for one or more time slices in the original frame (and other previously rendered similar frames) with one or more time slices in the later frame. In another example, a clock generation circuitry (not shown) can generate a clock signal with clock frequencies predicted using the activity data. Other implementations are contemplated.

In another implementation, the one or more parameters further include power states of a computing component while executing a given task, and sensitivity of the computing unit to changes in said power state. In an example, sensitivity of a computing unit to power changes may be indicative of how sensitive performance of the unit is to changes in power states, based on the types of tasks being executed, the types of units executing tasks, current operating frequency, current power consumption, as well as others. Based on the activity data, power states and sensitivity to changes in power state of a computing device for a given task, the power management circuitry 220 manages power consumption of the computing device for subsequent tasks relatively similar to the given task.

Predicting operating parameters, based on the activity data, may advantageously facilitate efficient power saving, by allowing the power management circuitry 220 to track infra-frame workload variations and determine a per-phase target frequency more optimally, rather than tracking just the average behavior over a frame or multiple frames. Systems and methods described herein may also result in improved performance-per-watt efficiency for processing devices.

Figure 3:
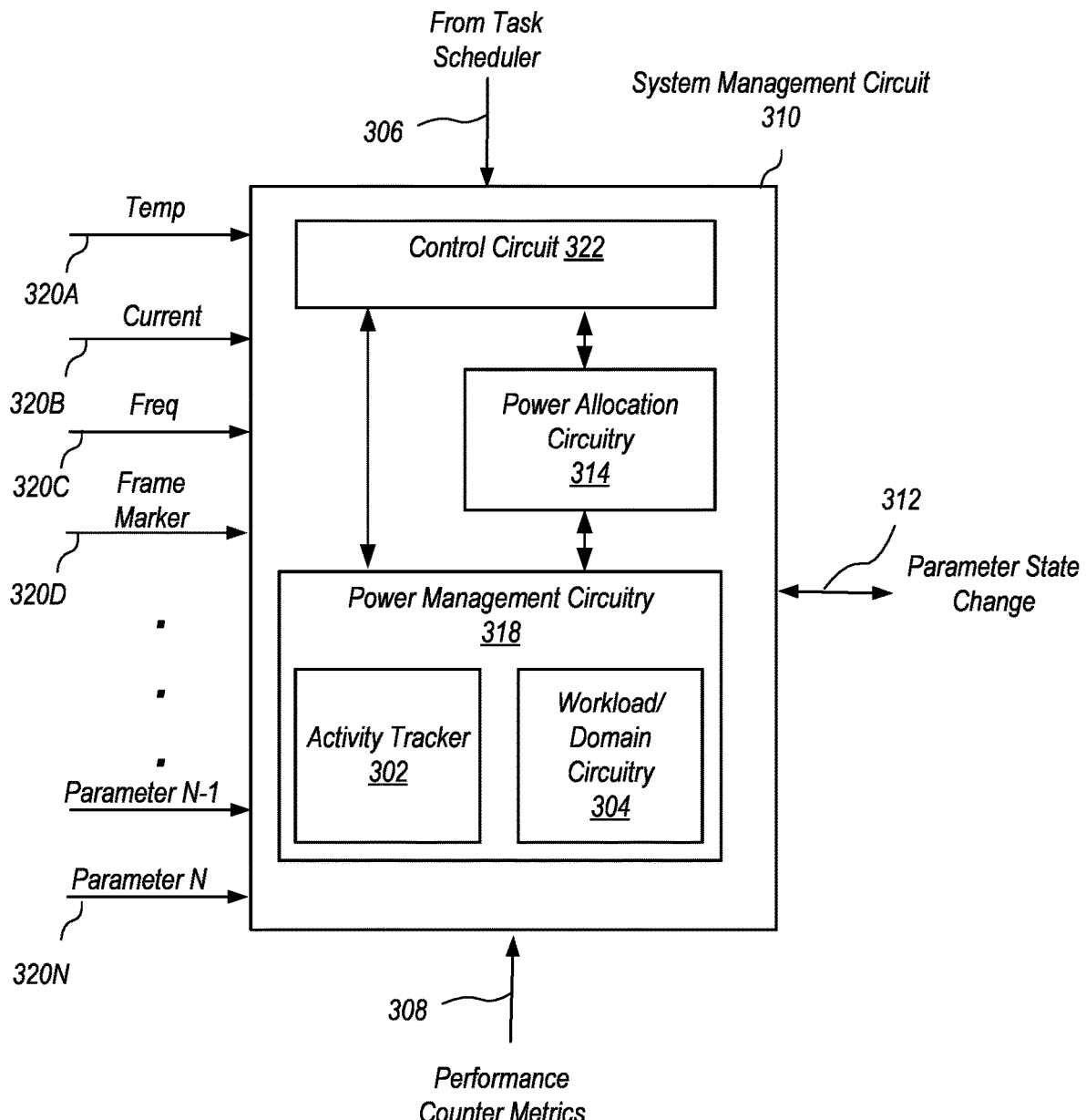
FIG. 3 is a block diagram of one implementation of a system management circuitry.

FIG. 3 illustrates a system management circuit 310 that includes a control circuitry 322, power allocation circuitry 314, and power management circuitry 318. The power management circuitry 318 further include activity tracker 302 and workload/domain unit 304. The control circuitry 322 is configured to determine how power is allocated in the computing system. Power allocation circuitry 314 is configured to allocate a power budget to one or more compute units (not shown), based at least in part on task related information 306 received from a task scheduler. Further, power management circuitry 318 manages operating frequencies and power consumption for a computing system.

System management circuit 310 is also shown as being configured to receive any number of various system parameters, shown as 320A-320N, that correspond to conditions, operations, or states of the system. In the example shown, the parameters are shown to include operating temperature 320A of a given unit(s), current drawn by given unit(s) 320B, operating frequency of a given unit(s) 320C, frame marker 320D (e.g., indicative of the beginning and end of a frame), and the like. Other parameters are possible and are contemplated. In an implementation, the frame markers 320D include information pertaining to individual frames being rendered, such as frame lengths, frame performance markers, frame starting frequencies, and the like. In one implementation, the frame markers 320D at least include frame boundary information such that the activity tracker 302 is enabled to identify when a frame ends and a new frame begins. Further, one or more performance counter metrics 308 are received that provide information about the performance of the GPU during a specific task or workload. These metrics can be used to identify performance bottlenecks, optimize performance, and debug issues.

In various implementations, the one or more parameters are reported from other units or parts of a system (e.g., based on sensors, performance counters, other event/activity detection, or otherwise). In some implementations, one or more parameters are tracked within the system management circuitry 310. For example, system management circuitry 310 tracks computing activity for an activity period, when executing a number of tasks. In an implementation, when the tasks include rendering of frames, the system management circuitry is configured to track computing activity of computing devices (e.g., compute units) for a given amount of time, wherein the amount of time is made up of one or more time slices. For example, during processing of frames, the system management circuitry 310 calls upon the activity tracker 302 to track computing activity for each time slice in each frame within the activity period. That is, for each frame, during a given time slice, the activity tracker 302 tracks operating parameters of the system while the frame is processed. This tracking is repeated for a number of frames. In one implementation, the time slices are identified based on a frame length of each frame under consideration. For example, "N" time slices may be identified such that each slice is "M" MS long, assuming each frame is "N*M" MS long. For each of the N time slices, the activity tracker 302 tracks computing activity for the corresponding frames. In various implementations, the tracked computing activity at least includes information about operating parameters of computing unit(s) when one or more tasks and sub-tasks associated with processing of frames are executed. The tasks can include scene setup, geometry processing, shading, rendering, post-processing, and the like. Other implementations are contemplated.

In some implementations, workload/domain circuitry 304 is configured to determine how characteristics of a given task vary from previously executed tasks, in a given set of tasks. Any change in a given characteristic can indicate to the activity tracker 302 that tracking of computing activity is to be initiated. Further, in cases where computing activity is currently being tracked by the activity tracker 302, a change in the given characteristics of one or more tasks can further indicate to the activity tracker 302 to recalibrate the activity period and resulting time slices. In various implementations, the recalibration of the activity period and time slices includes at least modifying a duration of the activity period and/or one or more time slices within the activity period. For example, a recalibrated activity period can be generated by changing a duration and number of time slices of an previously generated activity period. For example, an activity period of T milliseconds and comprising N time slices can be recalibrated to be of a duration greater than or lesser than T milliseconds. Accordingly, time slices are recalibrated to be greater than or lesser than N time slices. It is noted that this implementation is described to provide a simplified explanation of recalibrating activity periods and resultant time slices. However, in operation, there can be more complex calculations involved in such recalibrations. Such implementations are contemplated.

As mentioned in the foregoing, when the set of tasks includes rendering of frames, the characteristics include a frame length and the one or more parameters at least include an operating frequency of a computing unit while processing the given frames. Further, the activity tracker 302 can provide the tracked computing activity, stored as activity data, to one or both of power allocation circuitry 314 and power management circuitry 318 for use in making power allocation decisions. These decisions are provided to various processing units as parameter state changes 312. It is noted that though the methods and systems described herein focus on tracking computing activities to predicts operating parameters of computing units when executing tasks, in several other implementations, these systems and methods can be used to predict operating parameters for other subsystems such as a memory subsystem, and the like. Various such implementations and combinations are possible and are contemplated.

Figure 4:
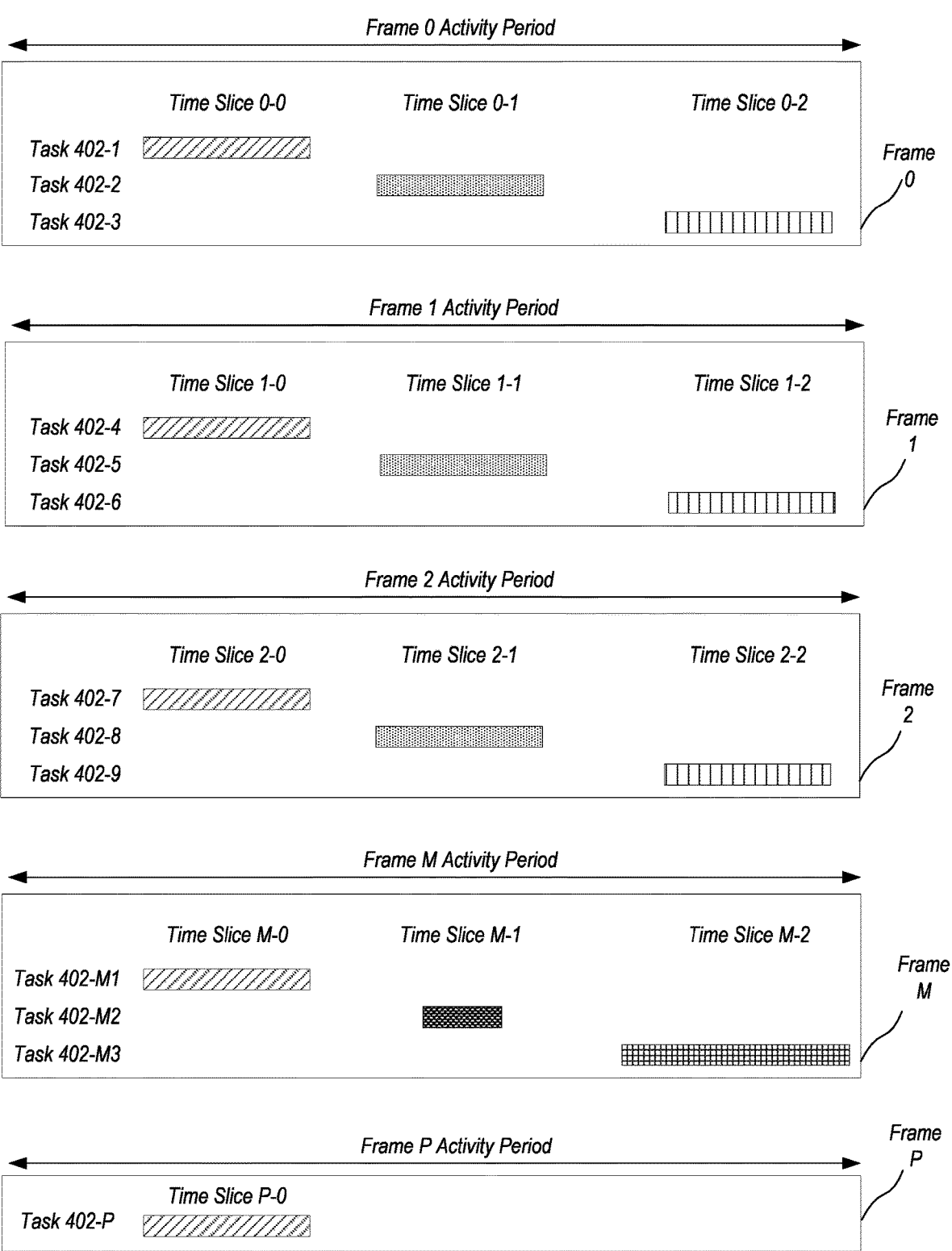
FIG. 4 is a block diagram illustrating tracking of computing activity during frame processing over one or more activity periods.

Turning now to FIG. 4, an exemplary implementation of a computing resource executing tasks for frame processing over one or more activity periods is illustrated. In an implementation, an activity tracker (e.g., the activity tracker 302 described in FIG. 3) is configured to track computing activity of one or more computing units, for a given period of time (hereinafter "activity period") divided into one or more time slices, when processing frames. In one implementation, for processing each frame, such as frames 0, 1, M, P etc., depicted in FIG. 4, a processing unit requires a certain amount of power and frequency to execute tasks associated with processing of the frame. In the example depicted in FIG. 4, various tasks 402-1 to 402-P are depicted. In one implementation, when rendering a frame, these tasks can include geometry processing, coordinate spacing, geometry culling, tessellating, and the like.

In one implementation, consecutive frames in a scene may be substantially similar due to a relatively small number of changes between the frames. Consequently, execution of a given frame is expected to be similar (e.g., consume a similar amount of processing and data resource, take a similar amount of time, etc.) to that of an immediately preceding frame when the scene is unchanged. The temporal locality between frames allows the activity tracker to correlate a time slice associated with a frame, i.e., a frame to be processed, with the time slices associated with one or more previously processed frames. Further, based on such a correlation, the system management circuitry predicts operating parameters for the subsequent frame within a given scene.

In an implementation depicted in the figure, frames 0, 1, and 2 are shown to be similar, i.e., having temporal locality amongst the frames. For instance, activity during time slice 0-0, 1-0, and 2-0, for frames 0, 1, and 2 respectively is the same (as denoted by similar shaded bars). Similarly, activity during time slices 0-1, 1-1, and 2-1, as well as time slices 0-2, 1-2, and 2-2 for frames 0, 1, and 2 respectively are also the same. It is noted that for the sake of brevity, only 3 frames are shown to have temporal locality, however, in various implementations any number of frames can be similar.

In one implementation, if a change in scene is identified, the activity tracker can recalibrate the time slices and track the activity data for subsequent frames during the modified time slices. When the activity tracker initiates tracking of computing activity, the activity tracker first identifies the time slices within the activity period of each frame, such that during each time slice, computing activity can be tracked. As shown in FIG. 4, when processing frame 0, time slices 0-0, 0-1, 0-2, and 0-3, are identified. Similarly, for frame 1, time slices 1-0, 1-1, and 1-2 are identified, for frame 2, time slices 2-0, 2-1, and 2-2 are identified, and for frame M, time slices M–0, M–1, and M–2 are identified. For frame P, time slice P–0 may be identified. In the example described in the figure, the time slices are identified based on a scenario where a computing resource is divided evenly among multiple tasks. That is, for each task 402-1 to 402-9, a corresponding time slice is identified, such that the activity period is "divided" into three equal time slices. In another scenario, time slices can also be identified based on a length of the frames. For example, computing activity is tracked during the activity period comprising time slices that are equally partitioned between the tasks. Alternatively, the activity period is unequally divided between tasks, with some tasks executing in longer time slices than others. For example, for frame M, each of time slice M–0, M–1, and M–2 are of unequal durations, i.e., tasks 402-M1, 402-M2, and 402-M3 can have unequal processing times.

In an implementation, computing activity of processing units, when executing one or more tasks during these time slices can be tracked. For example, for frame 0, task 402-1 is executed during time slice 0-0, task 402-2 is executed during slice 0-1, and task 402-3 is executed during slice 0-3. It is noted that although only a single task is depicted as being executed during a given time slice that for ease of explanation, however, multiple tasks can be executed during each identified time slice. In one implementation, during each time slice, the activity tracker tracks the computing activity when executing one or more tasks, and activity data resulting due to such tracking is stored in a data structure.

In an implementation, a given time slice of a frame is correlated to one or more time slices of one or more previously processed frames. In one implementation, the correlation is performed based on memory or engine utilization during similar time slices. Similar time slices can be identified based on the temporal locality of the frames. In the example shown in FIG. 4, if a compute unit is consuming the same amount of power, for a given percentage of time, both during slice 1-0 of frame 1 (frame 1 activity period), and time slice 0-0 of the frame 0 (frame 0 activity period), these time slices are correlated to one another. Further, based on this correlation, operating parameters of various computing units can be predicted for subsequent frame rendering. For instance, during time slice P–0, within frame P activity period, the operating parameters for execution of task 402-P are predicted using computing activity data stored during time slices 0-0, 1-0, 2-0, etc. and further correlating these time slices to time slice P–0 (similar time slices correlated with one another are depicted using the same shading patterns).

In an implementation, the operating parameters for a computing unit to execute tasks 402-P during time slice P–0 can be computed using stored activity data, e.g., as an average of operating clock frequencies during time slices 0-0, 1-0, and 2-0. Other implementations are contemplated. In one example, the activity data can be stored in any data structure, such as a lookup table (e.g., table 480 illustrated in FIG. 6). The activity data includes data resulting due to tracking of computing activity, including, frame information, corresponding time slices, executed tasks, and calculated operating parameters for each task. Other operating parameters such as power supply, voltage, number of cores, amount of utilized RAM, and the like can also be included in the activity data.

Based on the predicted operating parameters, the system management circuitry can manage operating frequencies and voltages for the system. In an exemplary implementation, if a compute unit is consistently under-utilized during a given time slice of a predetermined number of processed frames, the system management circuitry can reduce the frequency and voltage of the compute unit during the respective time slice of subsequent frames, e.g., to achieve higher power efficiency. In another implementation, if a memory subsystem utilizes an amount of power that exceeds a threshold value during a given time slice of a predetermined number of processed frames, for the same time slice of a subsequent frame(s), the power supply can be increased. Various such implementations for managing operating parameters of the system using computing activity tracked during time slices are possible and are contemplated.

Turning now to FIG. 5, an exemplary method 500 for tracking computing activity to predict one or more parameters of a task scheduled to be executed, is illustrated. It is noted that although the method 500 is described with respect to rendering of frames, other implementations relating to various computing tasks are contemplated.

In an implementation, a system management circuit identifies a plurality of time slices within a given period of time when processing a number of frames (block 502). In one implementation, the time slices are identified such that computing resource is divided evenly among multiple tasks. That is, for each task, a corresponding time slice is identified, such that the given period of time is "divided" into equal time slices. In another implementation, the time slices are based on a frame length of the frame under consideration. Other implementations of determining what time slices are to be considered for tracking computing activity within the given period of time are contemplated. Further, for each frame of the number of frames, a time period and corresponding time slices are identified for tracking computing activities.

For each time slice in the given period of time, an activity tracker tracks computing activity while processing the frames (block 504). In an implementation, for each frame currently processed, tasks and associated subtasks are executed within each identified time slice. The activity tracker is configured to track the computing activity during each time slice and store data resulting due to said tracking as activity data. The tracking continues for each frame during each time slice in the given time period.

Based on the activity data, a time slice corresponding to a given frame is correlated with a time slice associated with at least one previously processed frame from the number of frames (block 506). In an implementation, the time slice associated with the given frame is correlated with the time slice corresponding to at least one previously processed frame, based on comparison of computing activity of the given frame with computing activity tracked during a time slice corresponding to at least one previously processed frame. For example, for similar tasks executing both for the given frame and the at least one previously processed frame, time slices for both frames can be correlated based on activity data stored for the previously processed frame.

The system management circuitry is configured to predict operating parameters for the given frame based on the correlation between time slices (block 508). For instance, based on activity data identified within time slices during rendering of previously processed frames, the system management circuitry is configured to assess the operating parameters of a computing unit during a particular time slice for each of the previously processed frames, and predict the operating parameters for the corresponding time slice associated with the given frame. In an implementation, the operating parameters at least include clock frequencies.

In an implementation, based on the predicted operating parameters for the given frame, a processing unit is configured to render the given frame (block 510). In an implementation, a plurality of operating parameters, such as multiple operating frequencies and clock signals are predicted for time slices in the given frame, based on activity data registered during corresponding time slices in previously rendered frames. Particular operating parameters can then be predicted by the processing unit to render the given frame, based on which tasks are performed during a particular time slice.

In an implementation, during processing of each frame, the system management circuitry further determines a recalibration condition is met (conditional block 512). According to the implementation, the recalibration condition includes change in the frame length of a given frame. Such changes can be due to a change in scene or otherwise. In other implementations, recalibration conditions can also include unscheduled changes in frequency or supplied power, system malfunctions, temperature changes, and the like. In yet other implementations, a recalibration condition can further include operating parameters stored in the activity data not meeting certain criteria. For instance, in cases where a compute unit or memory sub system utilization behavior in for different time slices of a frame look very different from corresponding behavior in the same time slices for previous frames, recalibration can be initiated.

In case it is determined that a recalibration condition is met (conditional block 512, "yes" block), the system management circuit modifies time slices, i.e., modifies a tracking frequency or tracking period of computing activity within the given period of time. However, if no recalibration condition is met (conditional block 512, "no" leg), the method continues to block 504, wherein computing activity is continued to be tracked.

Unless stated otherwise, the described implementations are non-limiting. That is, the disclosed implementations are not intended to limit the scope of claims that are drafted based on this disclosure, even where only a single example is described with respect to a particular feature. The disclosed implementations are intended to be illustrative rather than restrictive, absent any statements in the disclosure to the contrary. The application is thus intended to permit claims covering disclosed implementations, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend on other independent claims. Similarly, features from respective independent claims may be combined where appropriate. Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The terms "comprising" and "including," and forms thereof, are open-ended and mean "including, but not limited to."

The phrase "based on" or "is used to" describes one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical such as a circuit, circuitry, etc). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing; the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
system management circuitry configured to:
    store first data corresponding to computing activity of a computing device for a time slice of a plurality of time slices of a first frame processed by the computing device;
    store second data corresponding to computing activity of the computing device for a time slice of a plurality of time slices of a second frame processed by the computing device; and
    prior to processing of a corresponding time slice of a third frame by the computing device, cause clock generation circuitry to generate a clock signal with a predicted clock frequency based at least in part on a correlation between the first data and the second data.

2. The system as claimed in claim 1, wherein the system management circuitry is further configured to store data representing computing activity of the computing device for each time slice of the plurality of time slices across multiple frames.

3. The system as claimed in claim 1, wherein the clock signal is used for rendering frame data.

4. The system as claimed in claim 1, wherein the system management circuitry is further configured to adjust an activity period of a given frame, responsive to a recalibration condition.

5. The system as claimed in claim 4, wherein the recalibration condition comprises one or more of change in a frame length, one or more unscheduled changes in clock frequency, or stored computing activity data not meeting a given criterion.

6. The system as claimed in claim 1, wherein the computing activity is stored as activity data and wherein the activity data is updated responsive to a change in at least one characteristic associated with at least one frame of a plurality of frames.

7. The system as claimed in claim 1, wherein the plurality of time slices are defined at least based in part on a processing time of each frame.

8. A method comprising:
    storing first data corresponding to computing activity of a computing device during a time slice of a plurality of time slices while processing a first frame;
    storing second data corresponding to computing activity of the computing device during a time slice of a plurality of time slices while processing a second frame;
    prior to processing a corresponding time slice of a third frame, causing clock generation circuitry to generate a clock signal with a predicted clock frequency based at least in part on a correlation between the first data and the second data; and
    processing the corresponding time slice of the third frame using the predicted clock frequency.

9. The method as claimed in claim 8, further comprising storing data corresponding to computing activity for each time slice of the plurality of time slices for a plurality of frames.

10. The method as claimed in claim 8, further comprising rendering frame data using the predicted clock frequency.

11. The method as claimed in claim 8, further comprising recalibrating an activity period of a given frame, responsive to a recalibration condition.

12. The method as claimed in claim 11, wherein the recalibration condition comprises one or more of change in a frame length, one or more unscheduled changes in clock frequency or power, and computing activity data not meeting a given criterion.

13. The method as claimed in claim 8, wherein data representing computing activity of the computing device is stored or updated in response to a change in at least one characteristic associated with at least one frame of a plurality of frames.

14. The method as claimed in claim 8, wherein the plurality of time slices are defined at least based in part on a processing time of each frame.

15. A computing system comprising:
    a computing device comprising circuitry configured to process frames;
    clock generation circuitry; and
    system management circuitry configured to:

store first data representing computing activity of the computing device for each of a plurality of time slices of a first frame processed by the computing device;

store second data representing computing activity of the computing device for each of a plurality of time slices of a second frame processed by the computing device;

generate, based at least in part on a relationship between the first data and the second data, a predicted clock-frequency for use in processing a third frame by the computing device; and cause the clock generation circuitry to supply a clock signal at the predicted clock-frequency to the computing device while the computing device renders the third frame.

16. The computing system as claimed in claim 15, wherein the system management circuitry is further configured to store data representing computing activity of the computing device for each time slice of the plurality of time slices across a plurality of frames.

17. The computing system as claimed in claim 15, wherein a time slice associated with a given frame is correlated with a time slice of a previously processed frame, based on comparison of data representing computing activity of the given frame with data representing computing activity of the previously processed frame.

18. The computing system as claimed in claim 15, wherein the system management circuitry is further configured to:

responsive to a recalibration condition, recalibrate one or more time slices of the first frame; and modify data associated with the one or more time slices of the first frame based on the recalibration.

19. The computing system as claimed in claim 15, wherein the system management circuitry is further configured to:

recalibrate one or more time slices of the first frame, responsive to a recalibration condition; and store revised data for recalibrated time slices.

20. The computing system as claimed in claim 19, wherein the recalibration condition comprises one or more of change in a frame length, an unscheduled change in clock frequency or supplied power for the system, or stored activity data not meeting a given criterion.

* * * * *